United States Patent [19]

Thielen

[11] Patent Number: 4,999,897
[45] Date of Patent: Mar. 19, 1991

[54] LAGGING REMOVAL TOOL

[76] Inventor: Udo E. Theilen, #305, 9644-134th St., Surrey, British Columbia, Canada, V3T 5M3

[21] Appl. No.: 181,568

[22] Filed: Apr. 14, 1988

[30] Foreign Application Priority Data

Apr. 24, 1987 [CA] Canada ................................. 535571

[51] Int. Cl.⁵ ............................................. B23P 19/04
[52] U.S. Cl. ......................................... 29/239; 29/235
[58] Field of Search ..................... 29/239, 221.5, 235, 29/243.5, 243.56; 72/210, 316, 294, 211; 83/870

[56] References Cited

U.S. PATENT DOCUMENTS

| 3,555,655 | 1/1971 | Drompp | 29/235 |
| 4,026,003 | 5/1977 | Leone | 29/235 |
| 4,324,029 | 4/1982 | Geisser | 29/239 |

Primary Examiner—J. J. Hartman
Attorney, Agent, or Firm—Barrigar & Oyen

[57] ABSTRACT

A tool for removing lagging strips from conveyor belt pulley drums is disclosed. A tool head is driven across the drum against the end of the strip, and simultaneously raises the metal clips which retain the lagging strip. Parallel tubular elements guide the tool head across the drum, and a hydraulic cylinder or winch may be used to power the tool head.

9 Claims, 9 Drawing Sheets

LAGGING REMOVAL TOOL

BACKGROUND OF THE INVENTION

The invention relates to conveyor belt systems and in particular to a tool for removing the worn lagging strips on a conveyor belt drum.

A common problem in conveyor belt systems where the belt is used to transport heavy materials, for example coal, is slippage of the conveyor belt on the pulley drums which drive the belt. A recent development has been the use on the drums of what are referred to "lagging strips". Lagging strips are long, rectangular, rubber strips which are secured to the circumference of the drum parallel to the axis of rotation. They have a thick central rubber portion which contacts the conveyor belt, and a thin border strip which secures the lagging strip to the drum by means of metal strips which are welded to the drum and are provided with clips to secure the edges of the lagging strips. This configuration has been found to give much better friction between the drum and the conveyor belt than would a continuous coating of rubber on the drum. The strips are typically 5⅜ inches wide and 11/16 inches thick.

As the lagging strips become worn it is necessary to replace them. This has been a difficult task as the metal clips become rusted and the lagging strips fused to the surface of the pulley. In the past, the method of removing the lagging has been to utilize a torch to loosen the lagging, use a hammer and chisel to loosen the metal clips from the lagging strips, and then use a tool such as a "come-along", hammers and chisels and torches to strip and remove the lagging from the pulley. This is a difficult and time consuming procedure. In the past up to four hours have been necessary to remove a single lagging strip, and it is also then difficult to install a new lagging strip as the metal clips have been bent out of shape and damaged. Further, in order to carry out this procedure it is necessary to shut the machine down, remove the pulley from the machine and transport it to a shop where the various tools are available. This results in the machine being out of commission for an extended period of time, resulting in substantial economic loss, unless the facility maintains replacement drive pulleys. As a typical drive pulley has about twelve lagging strips, it is apparent that the previous method was extremely time consuming.

The present invention provides a tool for quickly and effectively removing lagging strips from drive pulley drums. The present invention also leaves the metal clip in a condition after removal of the lagging strip such that the replacement strip may be easily installed. The present invention may be mounted directly on the pulley drum while the drum is still in place in the machine and accordingly it is not necessary to remove and transport the pulley drum. In contrast to prior methods, the present method allows the lagging strips from an entire drum to be removed much more quickly. Further, the procedure leaves the metal clips in a condition whereby the replacement lagging strip can be easily installed.

SUMMARY OF THE INVENTION

The present invention provides an apparatus for removing lagging strips from a conveyor belt pulley drum which comprises:

(a) a tool head having a lower surface having a circumference conforming to the outer circumference of the pulley drum whereby the tool head is adapted to slide in close contact with the outer circumference of the pulley drum, and lower forward edges which are adapted to simultaneously slide under and raise the metal clips which secure the lagging strips;

(b) guide means adapted to be secured to the drum and to guide the tool head across the surface of the drum; and, (c) power activated means for moving the tool head across the drum against the lagging strip in order to remove the lagging strip.

The guide means may comprise parallel tubes between which the tool head is guided. The power activated means may comprise a hydraulic cylinder to push the tool head, or winching means to pull the tool head across the surface of the drum.

The invention further provides a method for removing lagging strips from the surface of the conveyor belt pulley drum comprising the steps of installing guide means for guiding a tool head across the surface of the drum in alignment with the lagging strips, and driving or pulling a tool head against the lagging strip using power-activated means in order to push or pull the lagging strip from under its securing metal strips.

BRIEF DESCRIPTION OF THE DRAWINGS

In drawings which illustrate an embodiment of the invention.

DETAILED DESCRIPTION OF AN EMBODIMENT OF THE INVENTION

Figure 1:
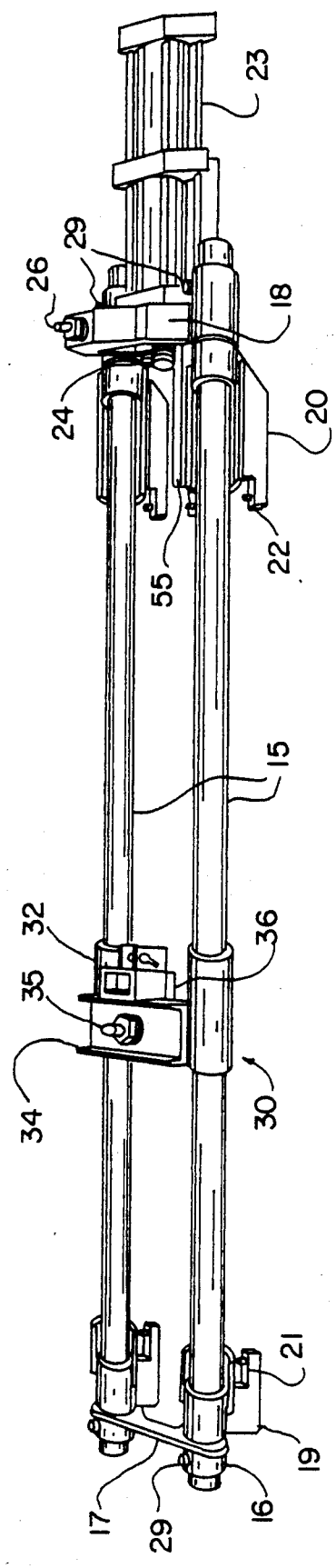
FIG. 1 is a perspective view showing the lagging strip removing apparatus of the invention prior to mounting on the pulley drum.
Figure 2:
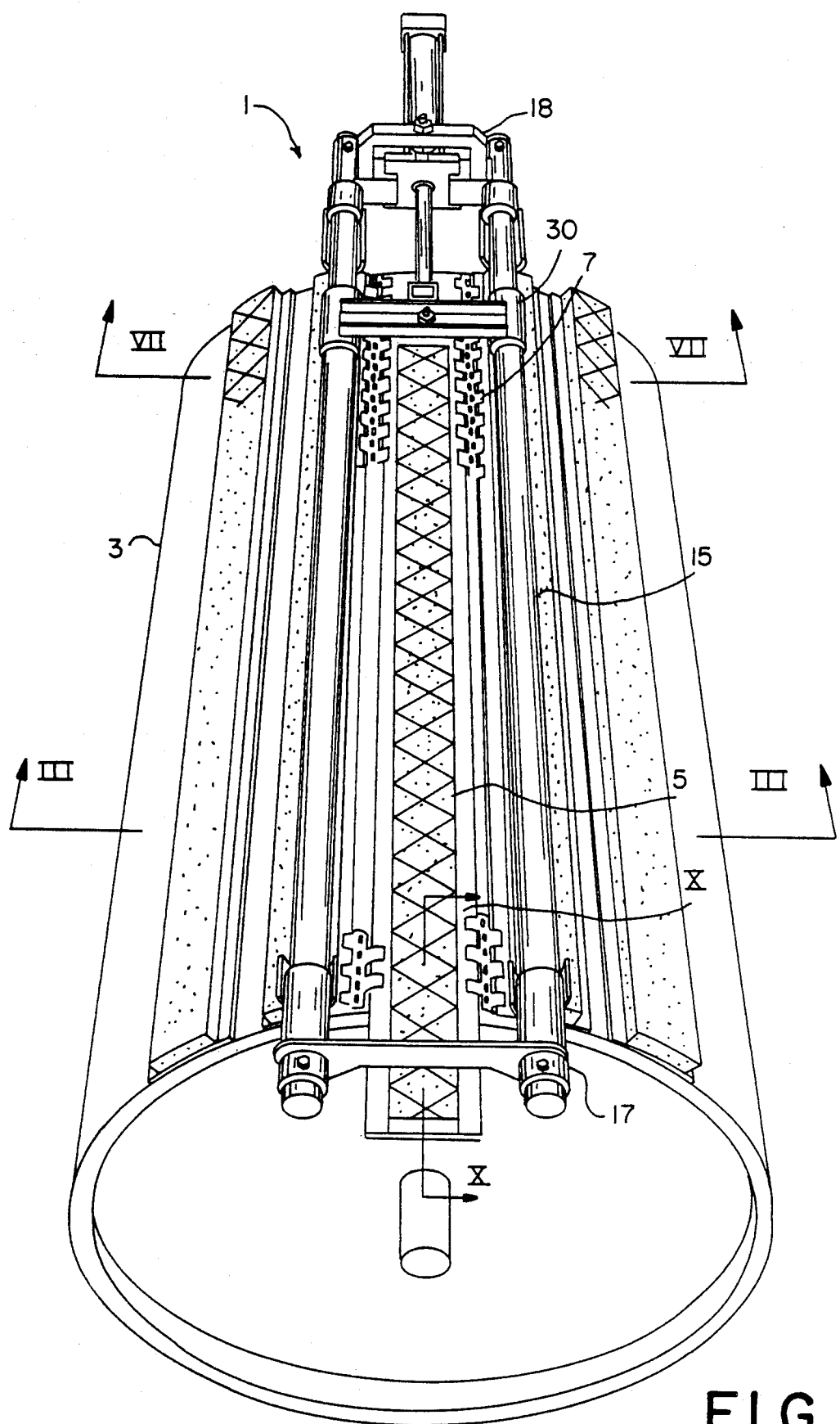
FIG. 2 is a perspective view of the invention mounted on a pulley drum and viewed from one end.
Figure 3:
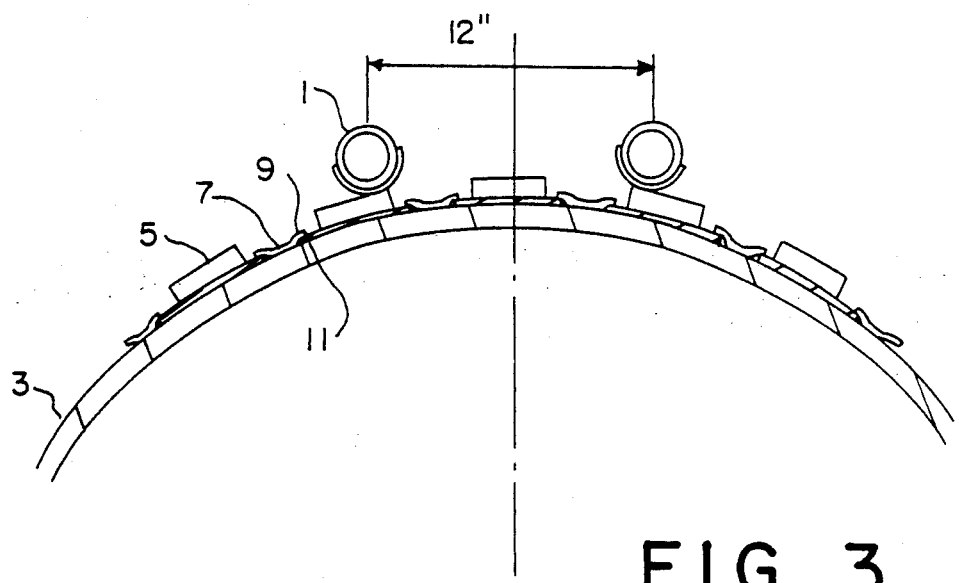
FIG. 3 is a partial cross-sectional view along the lines III—III of FIG. 2 showing the lagging strips and metal clip strips.

With reference to FIGS. 1 through 3, the lagging strip removal apparatus of the invention is referred to generally as 1. It is shown in FIGS. 2 and 3 mounted on pulley drum 3. Drum 3 has secured to its outer circumference lagging strips 5. Such strips are manufactured specifically for improving traction on the conveyor belt driven by the pulley drum and are of an extremely tough rubber. They are provided with treads to increase the traction. They are secured to the outer surface of the drum by metal clip strips 7. Such clip strips are welded to the surface of the drum, and have flanges 9 which bear against edges 11 of the lagging strips. The size of drum 3 will vary according to the particular conveyor belt system.

Figure 10:
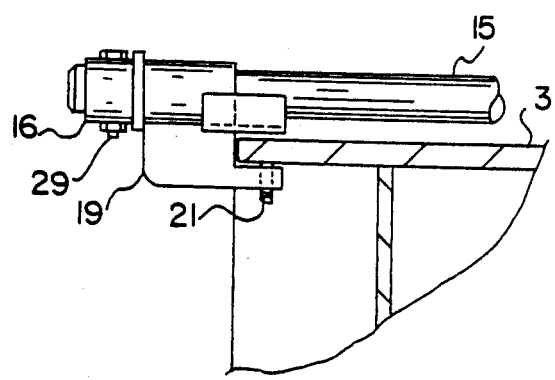
FIG. 10 is a cross-sectional view taken along lines X—X in FIG. 2.
Figure 11:
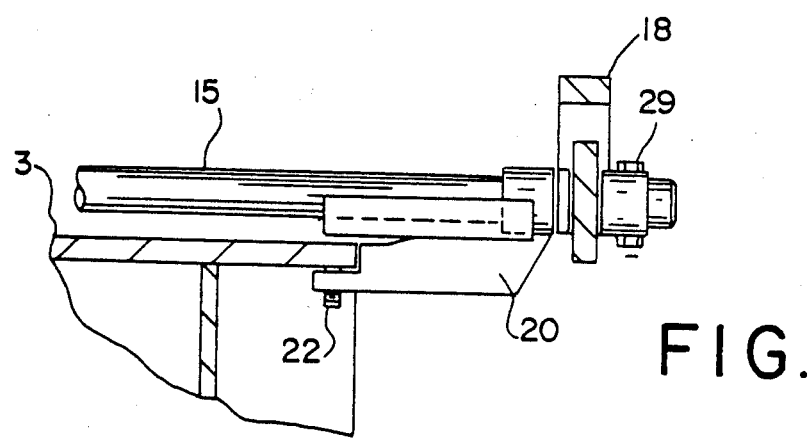
FIG. 11 is a cross-sectional view taken along lines XI—XI of FIG. 5.
Figure 12:
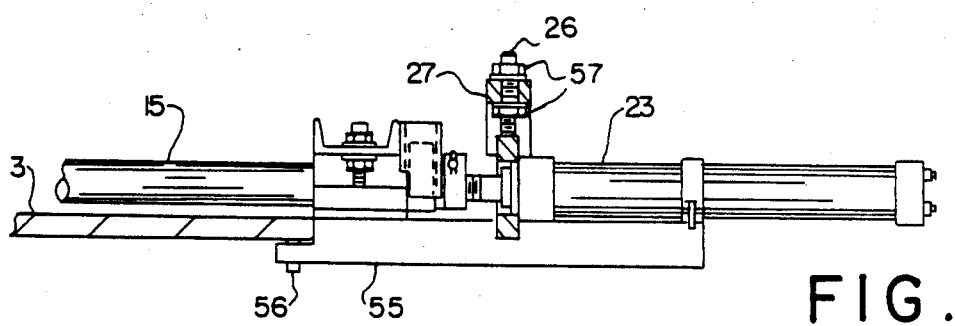
FIG. 12 is a cross-sectional view taken along lines XII—XII of FIG. 5.

The lagging remover 1 has two parallel guides 15 formed of two inch diameter stainless steel tubing. Guides 15 are maintained in parallel relationship by cross pieces 17 and cylinder guide assembly 18. Also secured to either end of each guide are height guides 19 and 20 which permit the device to be mounted on pulley drums of varying diameters using adjustable screws 21 and 22. Height guides 19 and 20 rotate freely on guides 15 to allow them to form different angles to the vertical and thus adapt to various curvatures of the drum. Cross piece 17 is notched to allow the lagging strip to pass under it. Cross piece 17 is mounted on sleeves 16 (see FIG. 10) which slide on guides 15. Bolts 29 secure sleeves 16 in position on the guide bars by means of holes in the ends of the bars.

Height guides 20 are similarly free to rotate on guides 15 to permit mounting on drums of various diameters. They are provided with adjustment screws 22 to allow securing to the edge of the drum. The inner portion of the height guides 19 and 20 are half-sleeves to permit the tool head assembly to pass over top of them.

Figure 6:
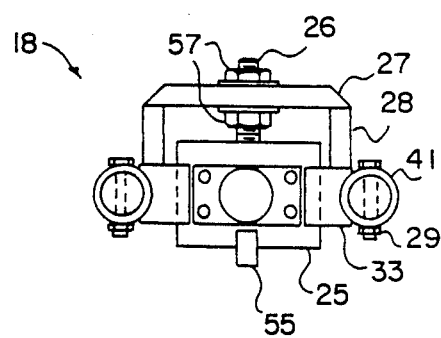
FIG. 6 is a cross-sectional view taken along line VI—VI of FIG. 5.

Mounted on cylinder guide assembly 18 is hydraulic cylinder 23. Hydraulic cylinder 23 has cylinder rod 24 which extends or retracts in response to the entrance or removal of pressurized hydraulic fluid into the hydraulic cylinder. The cylinder is mounted on cylinder mount 25, shown in further detail in FIG. 6. The height of cylinder mount 25 with respect to the guide bars can be adjusted by adjustable bolt 26. Guide assembly 18 consists of cross piece 27 through which passes bolt 26, vertical extensions 28 which are secured to cross piece 27, and slotted blocks 33 in which the cylinder mount, 25, slides. The blocks 33 are in turn secured to sleeves 41 which slide on guide bars 15 and are secured by bolts 29 which pass through holes in the end of the bars. Guide bar 55 is secured to the lower cross-piece of mount 25.

Figure 4:
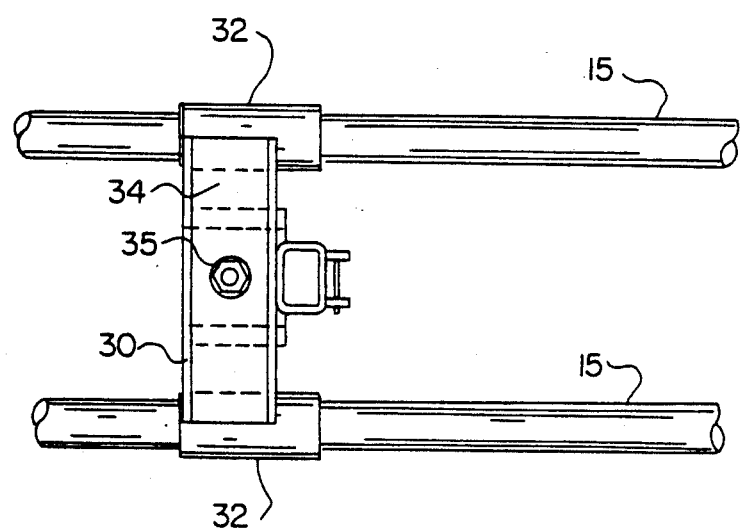
FIG. 4 is a partial top view showing the tool guide assembly.
Figure 5:
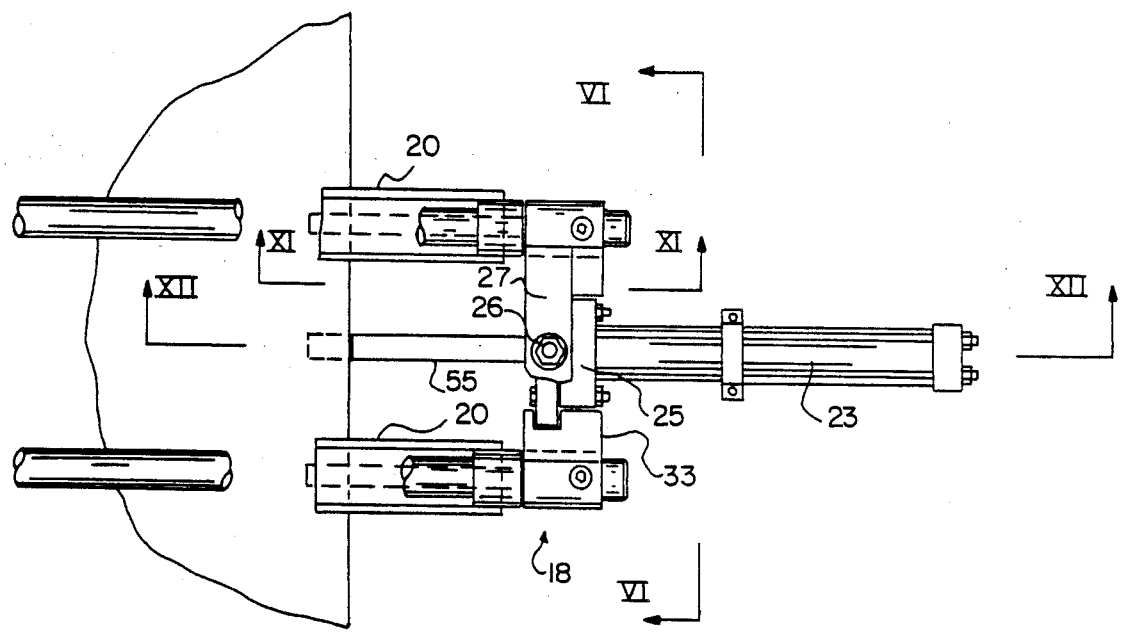
FIG. 5 is a top view showing the hydraulic cylinder assembly of the invention.
Figure 7:
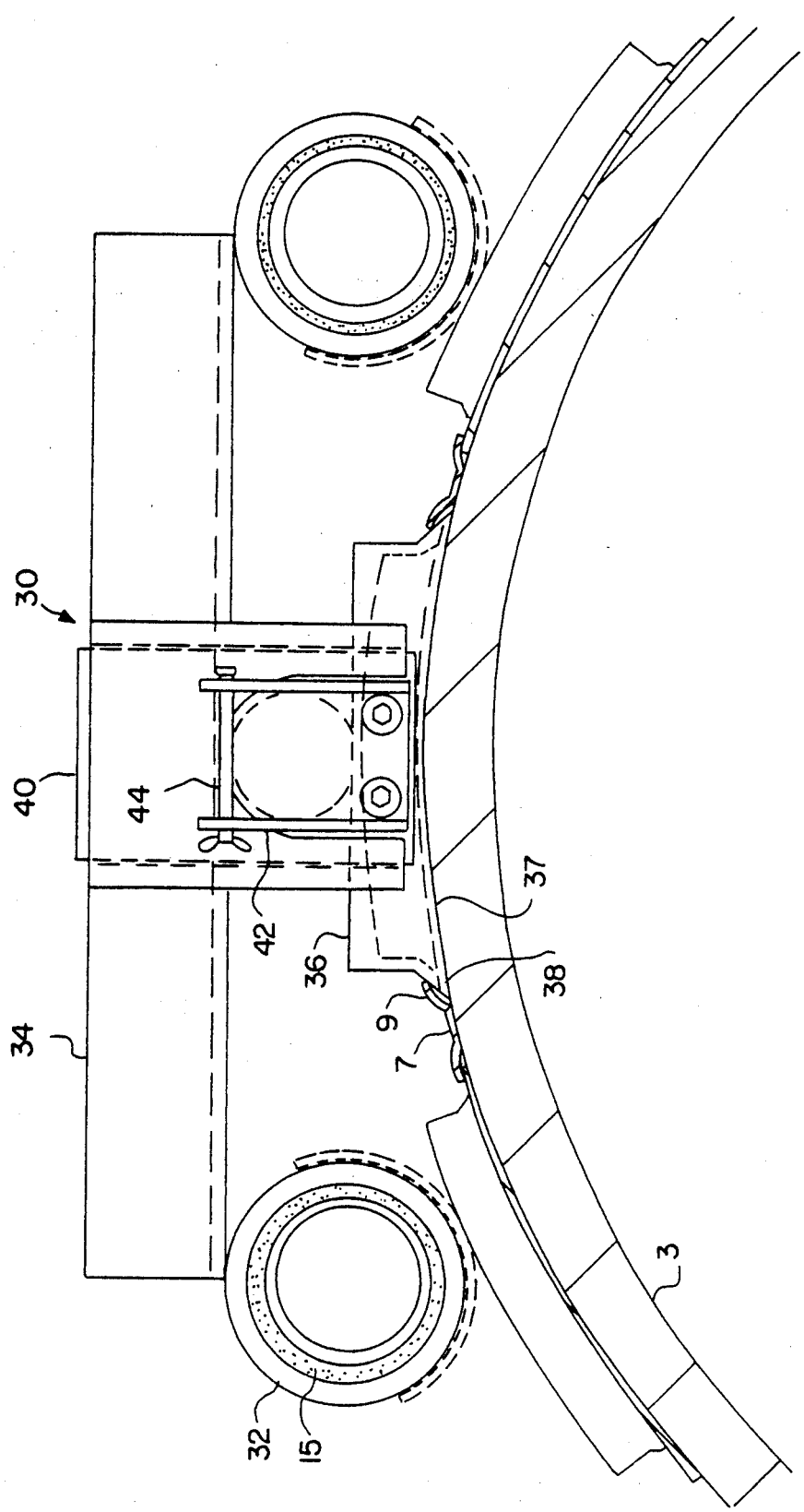
FIG. 7 is a cross-sectional view of the tool head assembly mounted on the pulley drum taken along lines VII—VII of FIG. 2.
Figure 8:
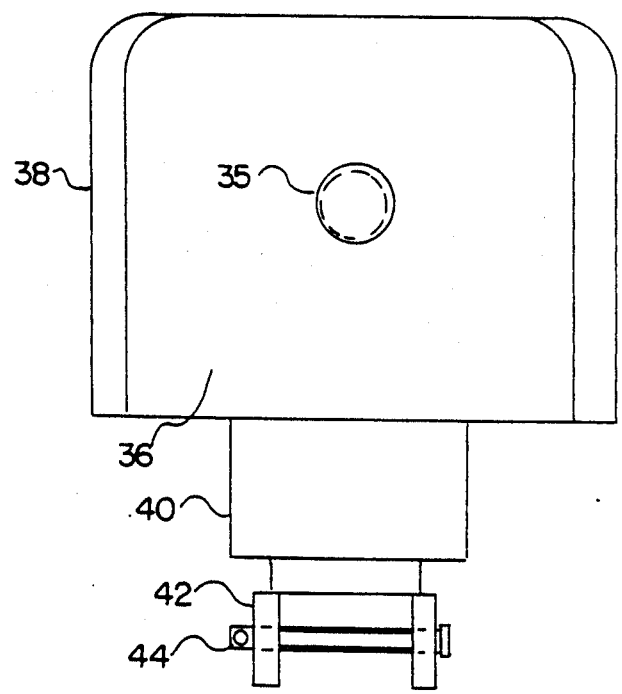
FIG. 8 is a top view of the tool head.
Figure 9:
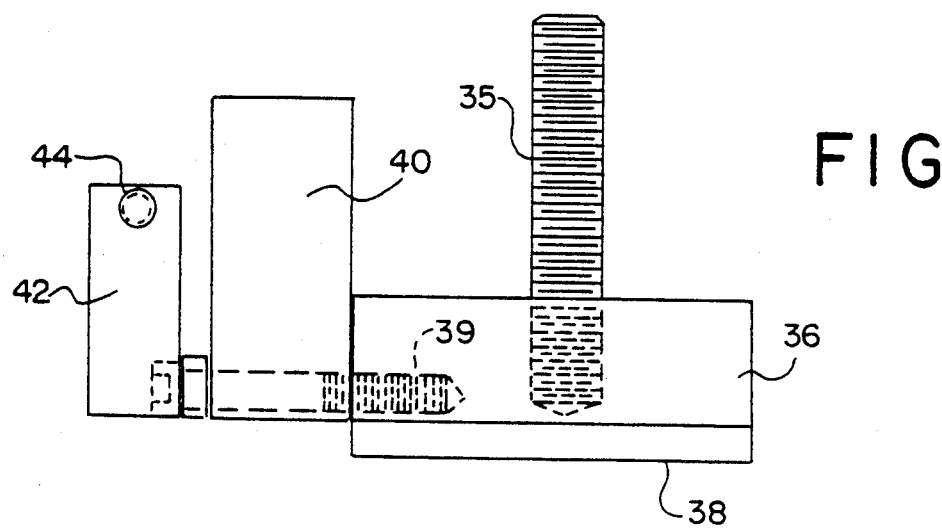
FIG. 9 is a side view of the tool head.

Mounted for longitudinal movement on guides 15 is tool head assembly 30 shown in FIG. 4. It consists of two pipe sections 32 having an interior diameter slightly greater than the diameter of guides 15 and provided with a sleeve bearing to allow easy movement along the guides. Cross piece 34 is welded to the two pipes 32. In turn bolted to cross piece 34 by bolt 35 is the tool 36 (see FIGS. 7-9). Tool 36 has a curved lower edge 37 to match the outer circumference of the pulley drum. The tool 36 also has outside edges 38 which are tapered or pointed to slide under the edges 9 of metal clips 7.

Bolted to tool 36 by bolt 39 is a push bar 40, and bolted in turn to push bar 40 is a saddle 42 which receives the push rod. A clevis pin 44 is provided to hold the push rod in place.

Figure 13A:
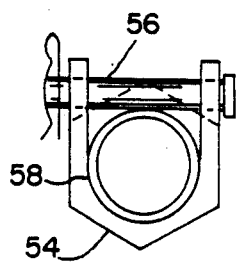
FIGS. 13a, 13b and 13c are side and end views of a coupling used in the invention.
Figure 13B:
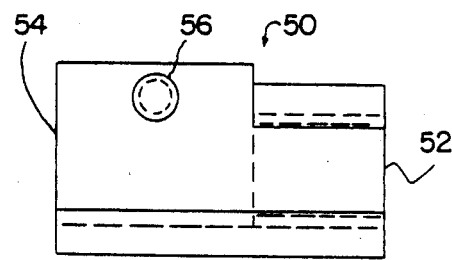
Figure 13C:
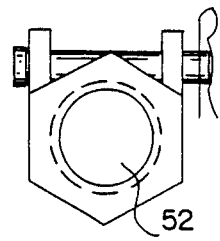

A coupling unit 50 shown in FIGS. 13a, 13b and 13c is utilized to connect the end of the cylinder rod 24 to the various extension rods as described further below. The coupling nut has a socket 52 which receives the end of the cylinder rod, and a U-shaped receptacle 54 on the other end of the unit which receives the end of the extension rod. A clevis pin 56 can be inserted to retain the extension rod 58 in place.

Guide bars 15 of different lengths are required for drums of different widths. Prior to installing the device the guide bars of appropriate length are selected and the tool head having the appropriate curvature to match the pulley drum is selected and installed on the tool head assembly 30. To mount the apparatus on the pulley drum, the guide bars 15 are laid loosely in parallel position on either side of the lagging strip to be removed. The tool head assembly 30 is mounted on the guide bars at an intermediate position. The height guide assemblies 19 and 20 may then be slipped in either end of the guide bars and tightened against the drum. Cross-pieces 17 and cylinder guide assembly 18 are then installed and bolted to the ends of the guide bars.

The height of the tool head is then adjusted to the appropriate level by adjustment bolt 35 so that the tool will just scrape along the surface of the drum and the tool edges 38 will slide under the edges 9 of the metal clips and lift them slightly as the tool is pushed down the length of the lagging. The curved edge of the tool head will contact the base of the lagging just above where it contacts the surface of the pulley drum. The height of the cylinder mount is adjusted by sliding in blocks 33 so that the top of the guide bar 55 is aligned with the surface of the drum and the cylinder rod will contact the tool head assembly in the appropriate location. This is done by adjusting the two nuts 57 on bolt 26. Adjustment screw 56 may then be tightened against the drum.

The hydraulic cylinder may then be activated to drive the end of the cylinder rod and tool head assembly against the end of lagging strip 5. On the order of 5,000 pounds of pressure will be required to initiate the movement. Once the cylinder rod has been fully extended, which is approximately 13⅛ inches in a standard case, the cylinder rod is retracted, coupling nut 50 is inserted over the end of cylinder rod 24, and an extension rod approximately 12¾ inches in length is inserted into the other end 54 of the coupling nut. The cylinder is again extended to contact the head assembly and drive the end of the extension rod against the tool head assembly through the full stroke of the hydraulic cylinder. This process is repeated, replacing the extension rod with extension rods of 25 1/5 inches, 38¼ inches and 51 inches in length until the tool nut assembly has been driven across the entire 66-inch width of the drum.

It will be seen that the tool head assembly in this way not only drives the lagging from the surface of the drum, but slides under and raises the metal clips which are then ready to receive the new lagging. This is facilitated by the rounded forward edge of the tool head edges 38 as shown in top view in FIG. 8. Also as previously indicated, the curvature of the lower surface of the tool head will vary according to the outside diameter of the pulley drum, and the length of guide bars 15 will be selected according to the width of the drums. The tool head will preferably be formed of hardened tool steel.

Figure 14:
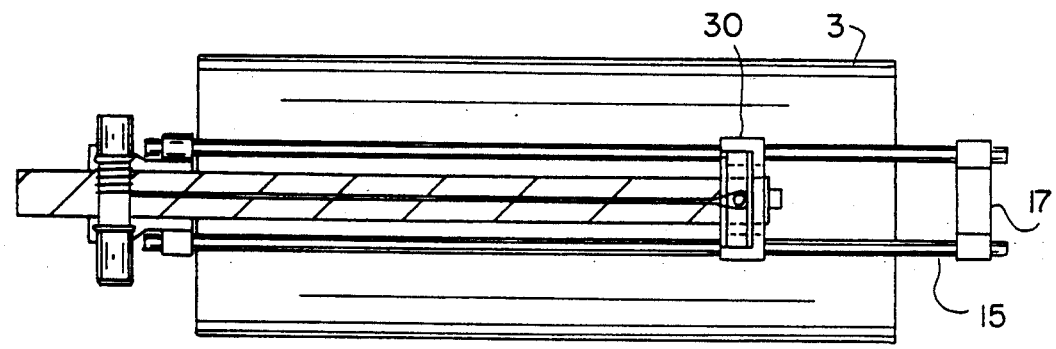
FIG. 14 is a top view of a second embodiment of the invention using a hydraulic winch rather than a hydraulic cylinder; and, FIG. 15 is a side view of the embodiment shown in FIG. 14, partially cut away to reveal the structure.
Figure 15:
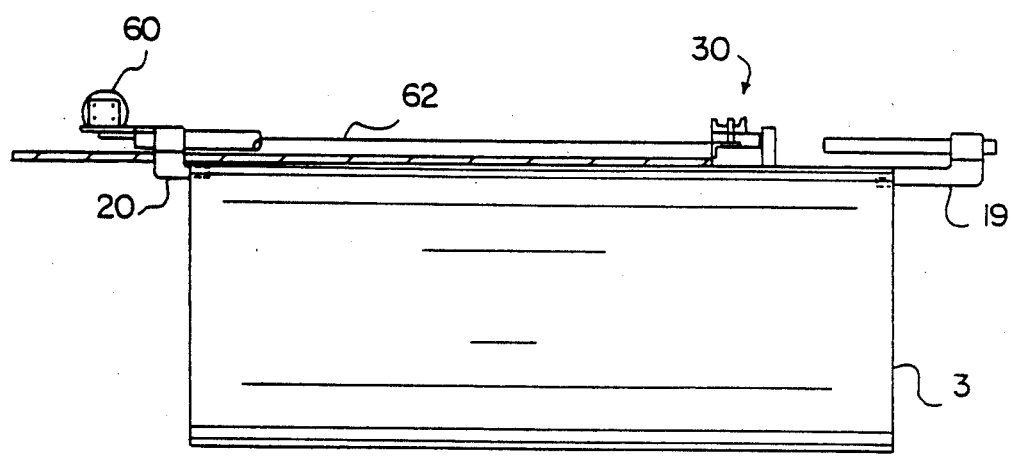

As shown in FIGS. 14 and 15, rather than utilizing a hydraulic cylinder to drive the tool head, a hydraulic winch 60 having a free-spooling clutch may be connected to the tool head assembly by a cable 62 to pull the tool assembly rather than using a hydraulic cylinder to push it. In other respects, this embodiment operates identically to the embodiment using the hydraulic cylinder.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. An apparatus for removing lagging strips secured to a conveyor belt pulley drum by means of parallel rows of metal clips from such drum, comprising:
   (a) a tool head having a lower surface having a circumference conforming to the outer circumference of said pulley drum whereby said tool head is adapted to slide in close contact with said outer circumference of said pulley drum, and lower side edges spaced apart a distance approximately equal to the distance between said parallel rows of metal clips and adapted to simultaneously slide under and raise said metal clips securing said lagging strips and a planar front face substantially perpendicular to said side edges and adapted to bear against an end of said lagging strips;
   (b) guide means adapted to be secured to said drum and to guide said tool across the width of said drum; and,
   (c) power activated means for moving said tool head across said drum, whereby said planar front face of said tool head bears against an end of said lagging strip, forcing said lagging strip ahead of said tool head along the surface of said drum out from under said metal clips and beyond an edge of said drum, said lower edges of said tool head sliding under and raising said metal clips.

2. The apparatus of claim 1 wherein said power activated means comprises a hydraulic cylinder.

3. The apparatus of claim 1 wherein said power activated means comprises a winch and cable.

4. The apparatus of claim 1 further comprising means for holding said tool head.

5. The apparatus of claim 4 wherein said means for holding said tool head is adapted to adjust the height of said tool head above said drum.

6. The apparatus of claim 4 wherein said guide means comprises parallel tubular members adapted to slidably receive said means for holding said tool head.

7. The apparatus of claim 6 wherein said parallel tubular members are provided at either end thereof with means for removable attachment to the edges of said pulley drum.

8. A tool head for removing a lagging strip from a conveyor belt pulley drum where said strip is secured to said drum by means of parallel rows of metal clips comprising a lower surface having a circumference conforming to the outer circumference of said pulley drum whereby said tool head is adapted to slide in close contact with said outer circumference of said pulley drum, and lower side edges spaced apart a distance approximately equal to the distance between said parallel rows of metal clips and adapted to simultaneously slide under and raise said metal clips securing said lagging strips and a planar front face substantially perpendicular to said side edges and adapted to bear against an end of said lagging strips, and means for connecting to said tool head power activated means for moving said tool head across said drum, whereby said planar front face of said tool head bears against an end of said lagging strip, forcing said lagging strip ahead of said tool head along the surface of said drum out from under said metal clips and beyond an edge of said drum, said lower edges of said tool head sliding under and raising said metal clips, and means for attaching said tool head to guide means to guide said tool across the width of said drum.

9. A method of removing lagging strips from pulley drums where said lagging strips are secured to said drum by means of parallel rows of metal clips, comprising:
   (a) providing a tool head having a lower surface having a circumference conforming to the outer circumference of said pulley drum whereby said tool head is adapted to slide in close contact with said outer circumference of said pulley drum, and lower side edges spaced apart a distance approximately equal to the distance between said parallel rows of metal clips and adapted to simultaneously slide under and raise said metal clips and a planar front face substantially perpendicular to said side edges and adapted to bear against an end of said lagging strips;
   (b) providing parallel guide means for guiding said tool across the width of said drum;
   (c) mounting said guide means onto said drum across the width of said drum; and
   (d) activating power-driven means for driving said tool head across said pulley drum whereby said planar front face of said tool head bears against the end of one of said lagging strips forcing said lagging strip ahead of said tool head along the surface of said drum out from under said metal clips and beyond an edge of said drum, and said lower edges of said tool head simultaneously raise said metal clips.

* * * * *